United States Patent
Omawari et al.

(10) Patent No.: US 6,874,348 B2
(45) Date of Patent: Apr. 5, 2005

(54) ANGULAR VELOCITY SENSOR AND METHOD OF ADJUSTING CHARACTERISTICS OF THE SENSOR

(75) Inventors: Tomomasa Omawari, Fukui (JP); Hiroyuki Tsubonouchi, Fukui (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 222 days.

(21) Appl. No.: 10/257,127

(22) PCT Filed: Feb. 18, 2002

(86) PCT No.: PCT/JP02/01377

§ 371 (c)(1),
(2), (4) Date: Jan. 27, 2003

(87) PCT Pub. No.: WO02/066930

PCT Pub. Date: Aug. 29, 2002

(65) Prior Publication Data

US 2004/0099043 A1 May 27, 2004

(30) Foreign Application Priority Data

Feb. 19, 2001 (JP) .......................................... 2001-041336

(51) Int. Cl.$^7$ .............................................. G01P 21/00
(52) U.S. Cl. ....................................................... 73/1.37
(58) Field of Search ................................. 73/1.37, 1.38, 73/504.01, 504.02, 504.16

(56) References Cited

FOREIGN PATENT DOCUMENTS

| JP | 54-71488 | 6/1979 |
|---|---|---|
| JP | 8-201065 | 8/1996 |
| JP | 9-201758 | 8/1997 |
| JP | 10-197254 | 7/1998 |
| JP | 11-351874 | 12/1999 |

OTHER PUBLICATIONS

International Search Report corresponding to application No. PCT/JP02/01377 dated Mar. 19, 2002.
English translation of Form PCT/ISA/210.

*Primary Examiner*—Robert Raevis
(74) *Attorney, Agent, or Firm*—RatnerPrestia (57) ABSTRACT

In an angular velocity sensor including two oscillators, the oscillators are balanced in weight precisely, thus providing improved output characteristics. In the sensor, at least one of the two oscillators has a notch having a surface roughness of not higher than 2 μm on an edge thereof.

8 Claims, 14 Drawing Sheets

PRIOR ART

Fig. 14

ANGULAR VELOCITY SENSOR AND METHOD OF ADJUSTING CHARACTERISTICS OF THE SENSOR

This Application is a U.S. National Phase Application of PCT International Application PCT/JP00/02562.

TECHNICAL FIELD

The present invention relates to an angular velocity sensor and a method of adjusting characteristic of the sensor for use in attitude control or navigation systems for moving objects, such as air crafts or vehicles.

BACKGROUND ART

A conventional angular velocity sensor is disclosed in Japanese Patent Laid-Open Publication No.11-351874.

Figure 13:
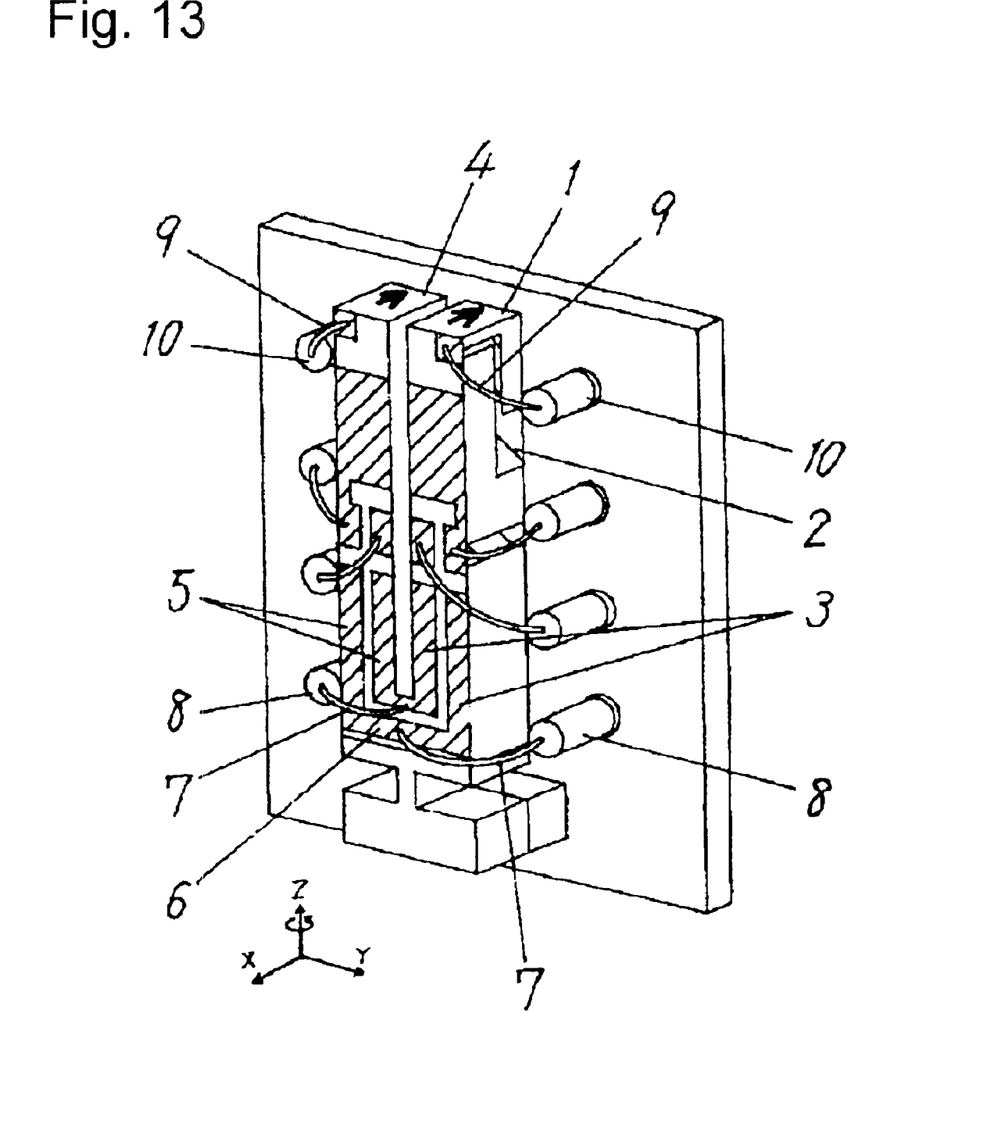
FIG. 13 is a perspective view of a conventional angular velocity sensor.

FIG. 13 is a perspective view of the conventional angular velocity sensor. First detecting electrodes 2 are provided on side surfaces of a first oscillator 1 made of e.g. quartz, and first driving electrodes 3 are provided on a front surface. Similarly, second detecting electrodes (not shown) are provided on side surfaces of a second oscillator 4, and second driving electrodes 5 connected to the first driving electrodes 3 on the first oscillator 1 are provided on the front surface. A joint 6 unitarily connects the first oscillator 1 to the second oscillator 4 at their respective ends. Driving wires 7 are electrically connected at respective one ends to the first driving electrodes 3 and the second driving electrodes 5, and are connected at respective other ends to two driving terminals 8. Detecting wires 9 are electrically connected at respective one ends to the first detecting electrodes 2 and the second detecting electrodes (not shown), and are connected at respective other ends to two detecting terminals 10.

An operation of the conventional angular velocity sensor will be explained.

When the first driving electrodes 3 and the second driving electrodes 5 are fed via the driving wires 7 with an alternating-current voltage from the driving terminals 8, the first oscillator 1 and the second oscillator 4 start oscillating along the Y axis. Then, as the angular velocity sensor is urged at an angular velocity about the Z axis, a Coriolis force is developed on the first oscillator 1 and the second oscillator 4 and deforms the first oscillator 1 and the second oscillator 4 along the X axis. The deformation generates a charge to be output through the first detecting electrode 2 and the second detecting electrode (not shown). The charge is then transferred via the detecting wires 9 and the detecting terminals 10 to a computer (not shown) which determines an angular velocity.

When the first oscillator 1 and the second oscillator 4 are not balanced in weight, they may deform along the X axis due to the unbalance weight even if the angular velocity sensor is not applied an angular velocity to. This causes a charge to be generated on the first detecting electrode 2 and the second detecting electrode (not shown).

Figure 14:
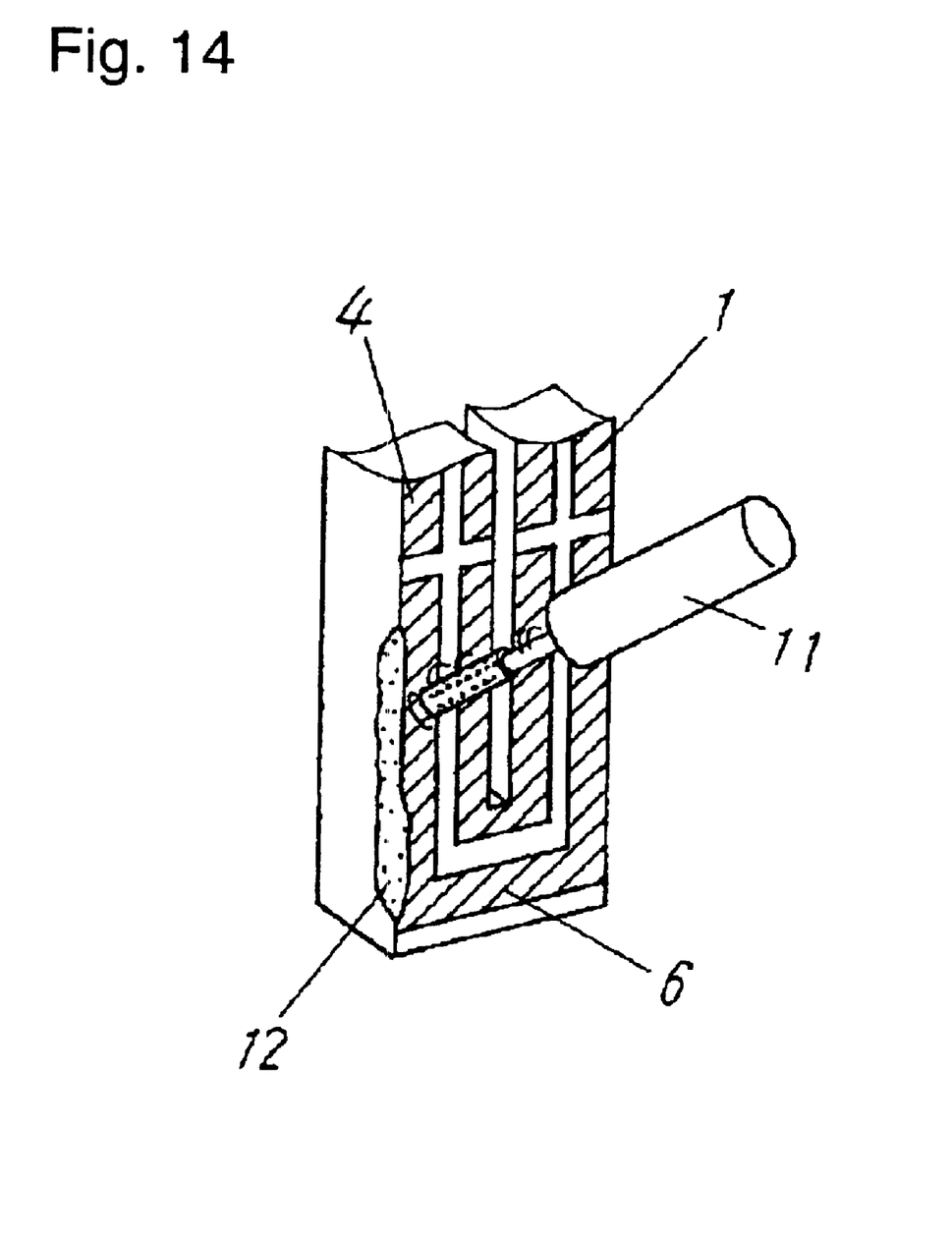
FIG. 14 is a perspective view showing a rewter grinding an oscillator in the conventional angular velocity sensor.

For balancing the weight between the first oscillator 1 and the second oscillator 4 in the conventional angular velocity sensor, a rewter 11 grinds edges of the second oscillator 4 and the joint 6 to make a desired size of ground portion 12, as shown in FIG. 14.

Since the rewter 11 spins to grind the edges of the second oscillator 4 and the joint 6 in the conventional angular velocity sensor to make the ground portion 12, a small eccentric movement of the rewter may cause the ground portion 12 to be finished with a surface roughened as course as about 5 μm. The angular velocity sensor accordingly produce a voltage of substantially ±10 mV when no angular velocity is applied, as shown in Table 1, hence declining output characteristics of the sensor.

TABLE 1

|  | Surface Roughness Rmax (μm) | Output Voltage with No Angular Velocity (mV) |
| --- | --- | --- |
| Sample 1 | 4.8 | +6.2 |
| Sample 2 | 4.6 | +8.2 |
| Sample 3 | 4.9 | +9.4 |
| Sample 4 | 4.7 | −7.1 |
| Sample 5 | 4.7 | −5.4 |

SUMMARY OF THE INVENTION

An angular velocity sensor includes a first oscillator including at least one of a driving electrode and a detecting electrode, a second oscillator including at least one of a driving electrode and a detecting electrode, and a joint coupling the first and second oscillators. At least one of the first and second oscillators has a notch having a surface roughness of not higher than 2 μm in an edge thereof In the sensor having the oscillators, this arrangement allows the oscillators to balance in weight accurately, thus being improved in its output characteristics.

DESCRIPTION OF THE PREFERRED EMBODIMENT

Figure 1:
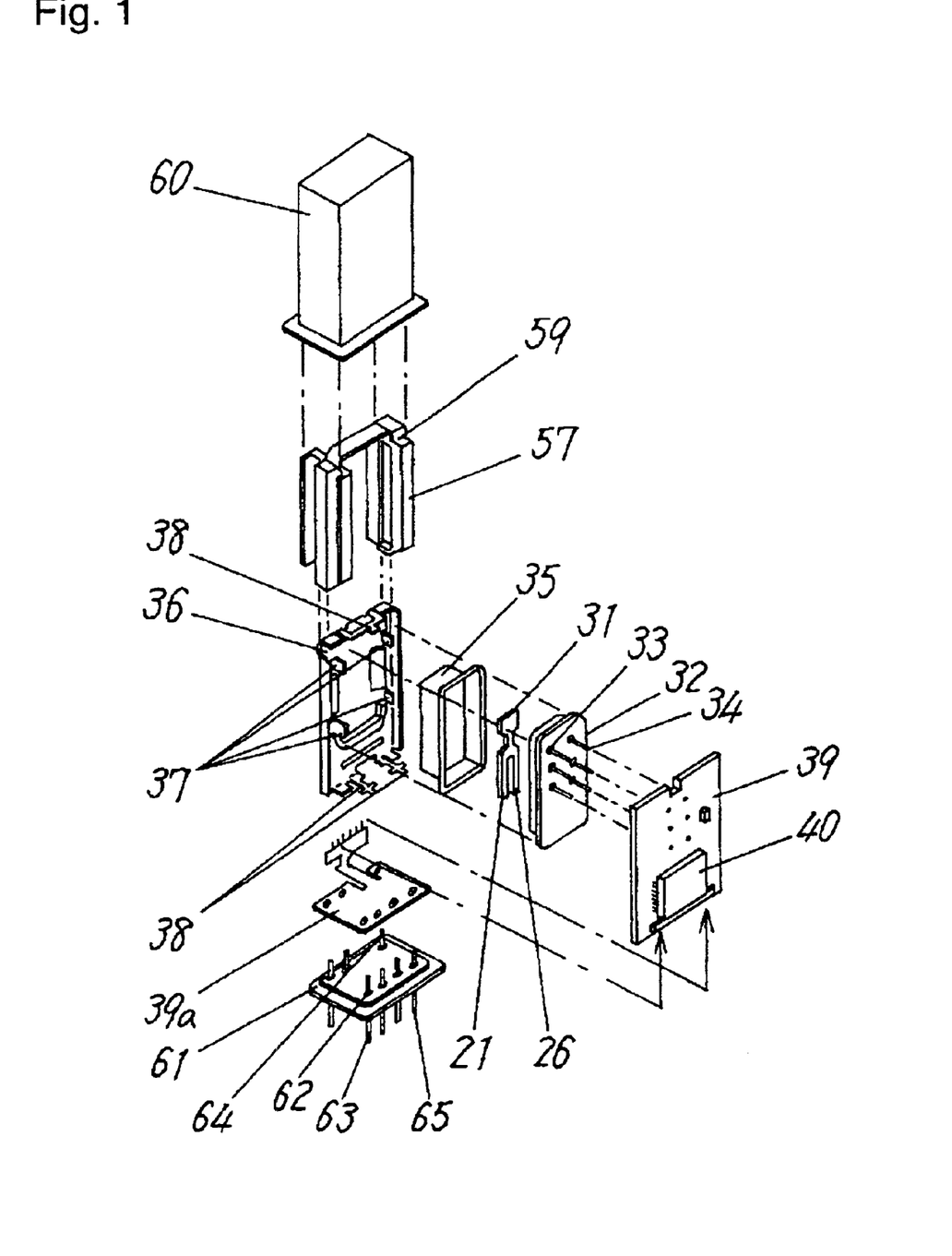
FIG. 1 is an exploded perspective view of an angular velocity sensor according to an exemplary embodiment of the present invention.
Figure 2:
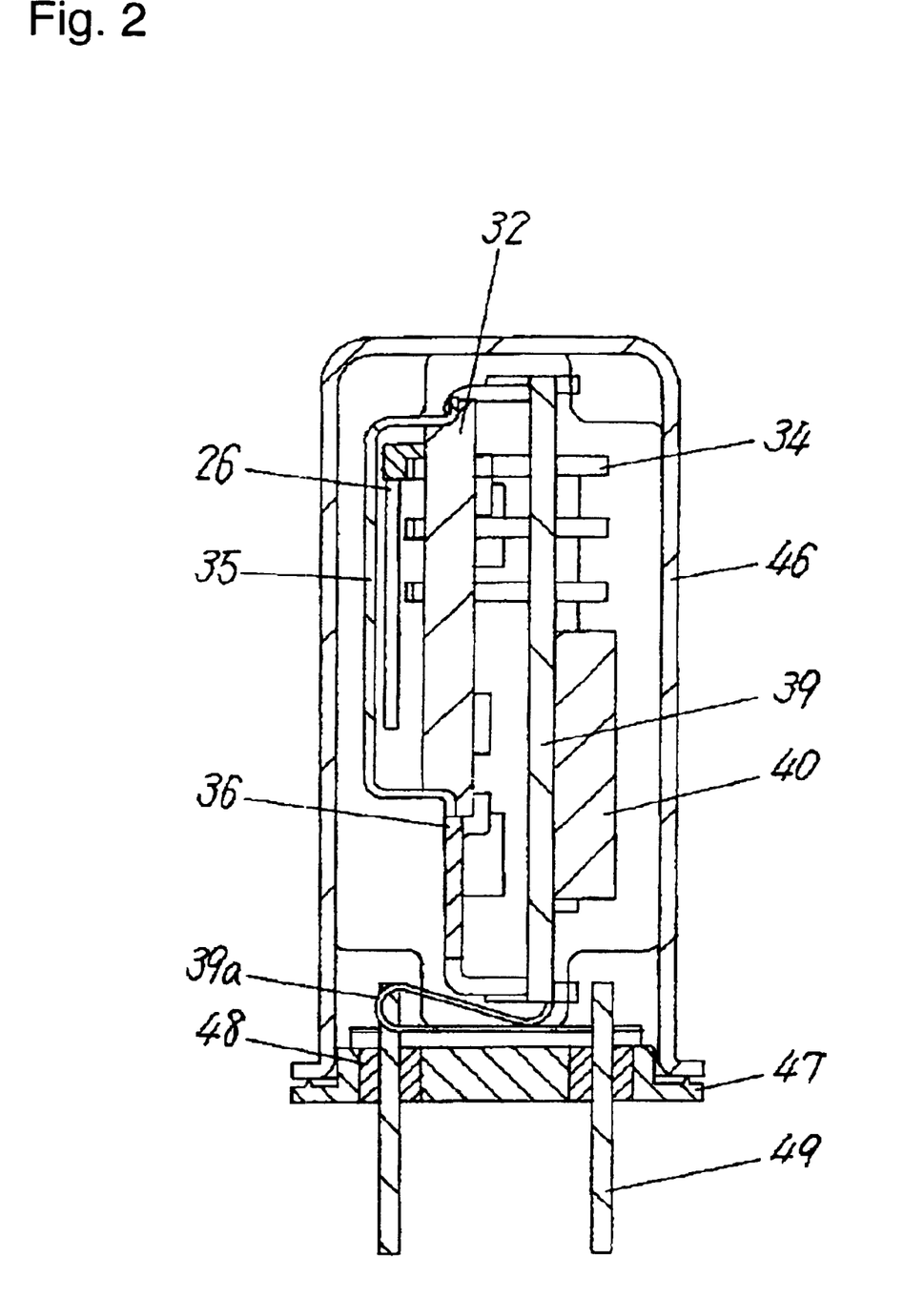
FIG. 2 is a side cross sectional view of the angular velocity sensor according to the embodiment.
Figure 3:
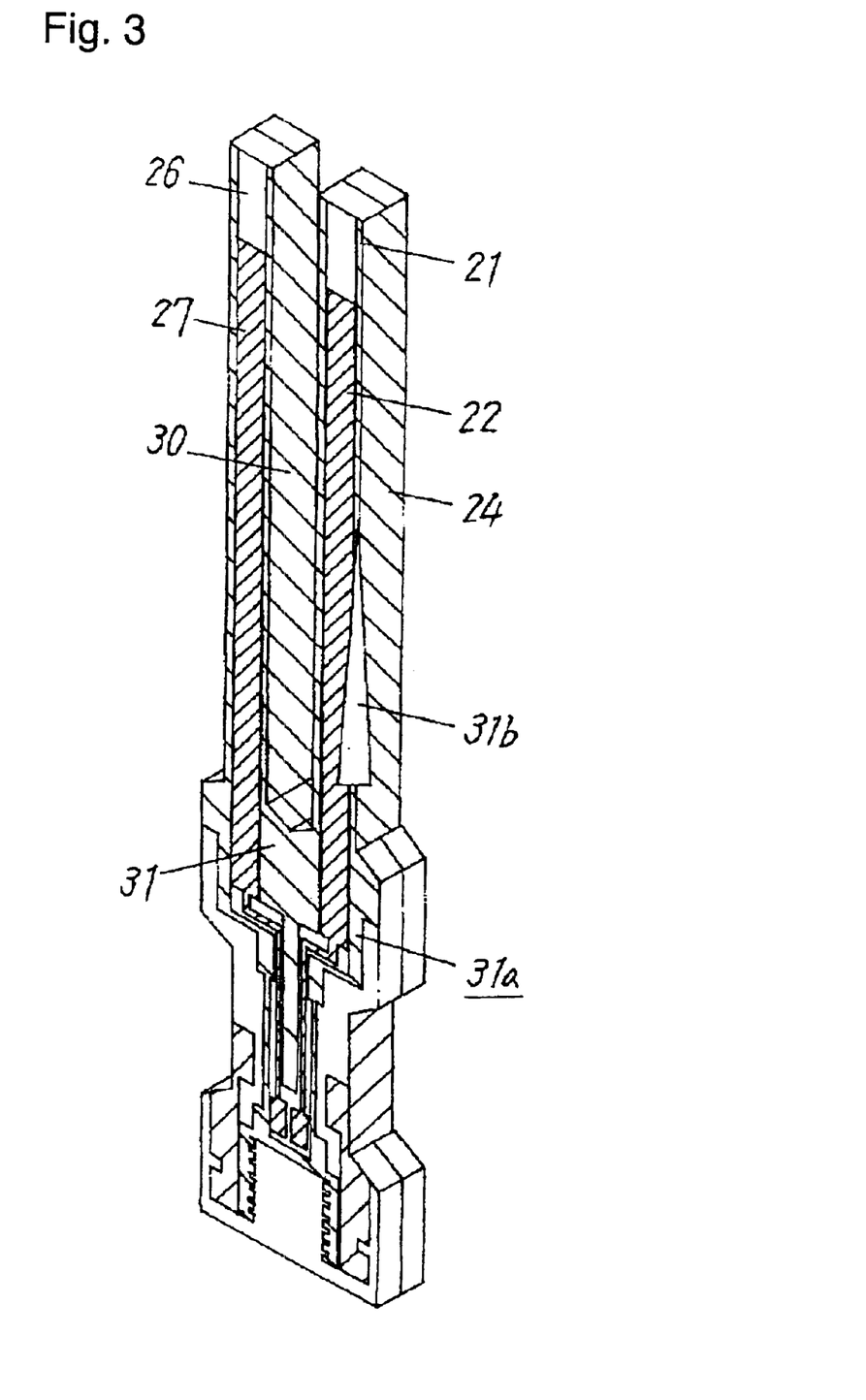
FIG. 3 is a perspective view of a primary part, a tuning fork of the angular velocity sensor according to the embodiment.
Figure 4:
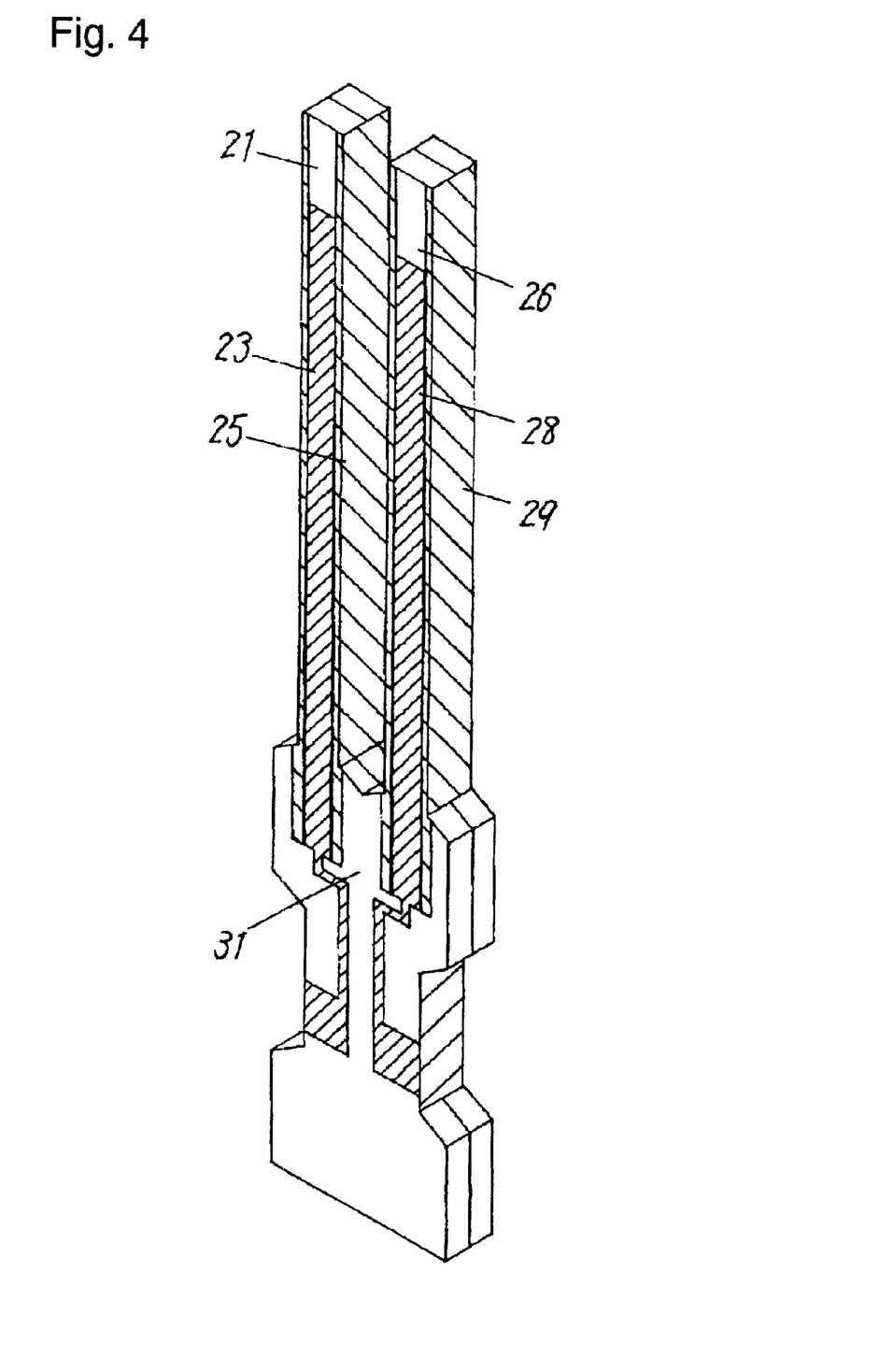
FIG. 4 is a perspective view of the tuning fork of the angular velocity sensor according to the embodiment.
Figure 5:
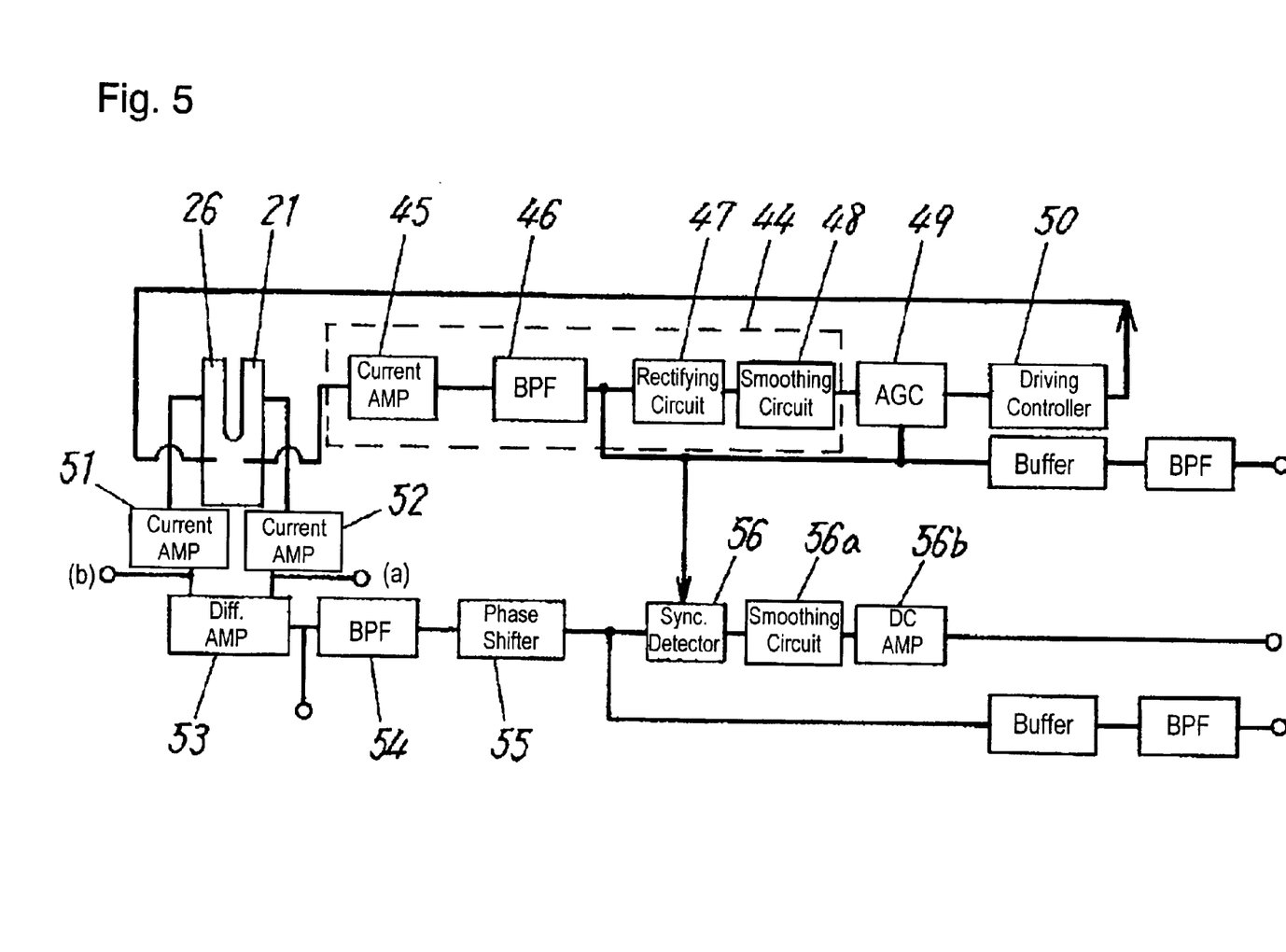
FIG. 5 is a block diagram of a circuit board of the angular velocity sensor according to the embodiment.

FIG. 1 is an exploded perspective view of an angular velocity sensor according to an exemplary embodiment of the present invention, and FIG. 2 is a side cross sectional view of the sensor. FIG. 3 is a perspective view of a primary part, i.e., a tuning fork of the angular velocity sensor of the embodiment, and FIG. 4 is a perspective view of the tuning fork seen from back. FIG. 5 is a block diagram of a circuit board of the sensor.

Figure 10:
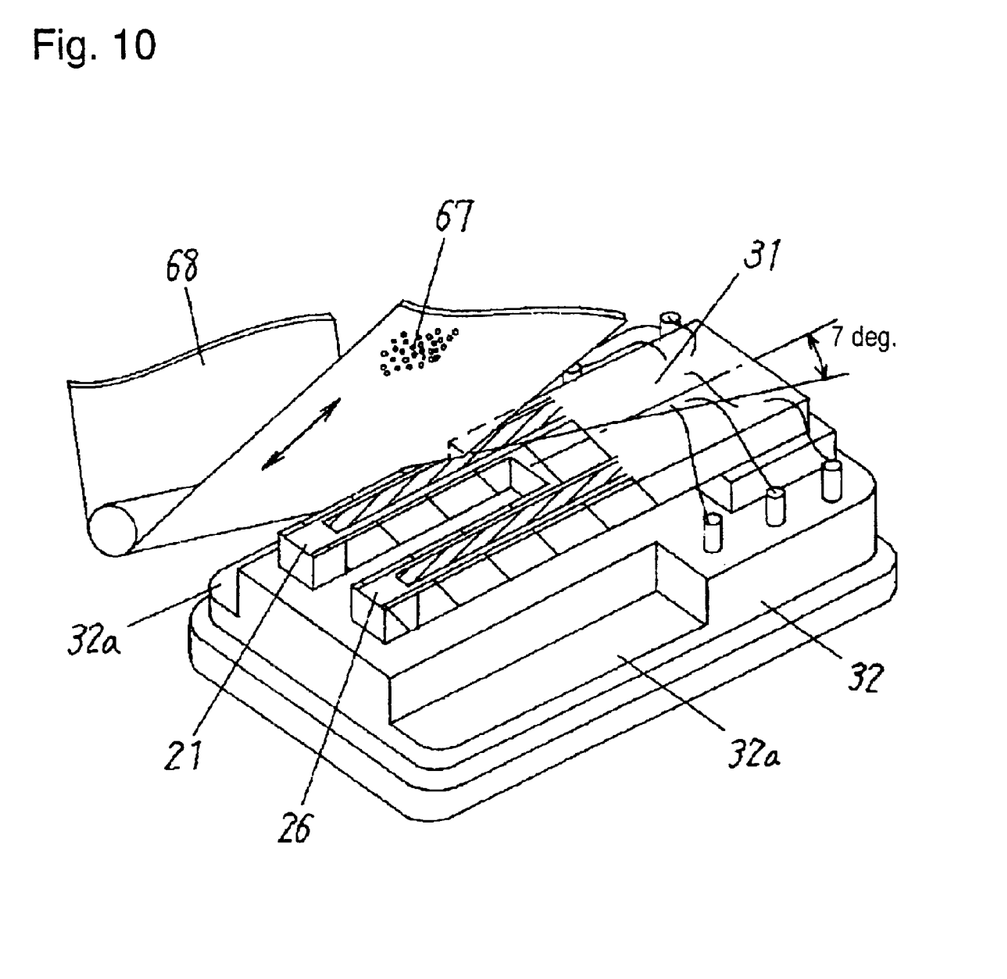
FIG. 10 is a perspective view showing a step of grinding the tuning fork of the angular velocity sensor according to the embodiment.

A first oscillator 21 includes sheets of mono-crystalline quartz which have different crystalline axes, and has a first driving electrode 22 on its front surface, as shown in FIG. 3, and has a second driving electrode 23 on its back surface, as shown in FIG. 4. The first oscillator 21 includes a first detecting electrode 24 and a second detecting electrode 25 both made of gold on its outer and inner side surfaces, respectively. A second oscillator 27 includes sheets of mono-crystalline quartz which have different crystalline axes, and has a monitor driving electrode 27 made of gold on its front surface, and has a third driving electrode 28 on its back surface. The second oscillator 26 includes a third detecting electrode 29 and a fourth detecting electrode 30 on its outer and inner side surfaces, respectively. A joint 31 made of quartz connects one end of the first oscillator 21 to one end of the second oscillator 26. The first oscillator 21, the second oscillator 26, and the joint 31 are unitarily integrated to a tuning fork 31a. The first oscillator 21 of the tuning fork 31a has a notch 31b having a surface roughness of not higher than 2 $\mu$m on one edge of the front surface thereof. Upon the size of the notch 31b being varied, the first oscillator 21 and the second oscillator 26 are balanced in weight. The joint 31 is fixed to a first base 32 made of metal having six terminal insertion holes 33 provided therein. The terminal insertion holes 33 accept six terminals 34 electrically connected to the first driving electrode 22, the second driving electrode 23, the third driving electrode 28, the monitor electrode 27, the first detecting electrode 24, the second detecting electrode 25, and the third detecting electrode 29, and the fourth detecting electrode 30. As shown in FIG. 10, setbacks 32a are provided in the base 32 as facing the notches 31b of the first oscillator 21 and the second oscillator 26. A metal cover 35 is mounted to the outer edge of the first base 32 and accommodates the turning fork 31a including the first oscillator 21, the second oscillator 26, and the joint 31 with the first base 32. A metal support 36 has a support portion 37 on one side thereof for supporting the first base 32. More specifically, with the support portion 37 swage-locked to the first base 32, the support 36 is coupled to the first base 32. The support 36 has three support projections 38 provided on both lengthwise ends thereof. A circuit board 39 is joined by soldering to the support projections 38 of the support 36 to extend in parallel with the support 36. Electronic components 40 are mounted on the circuit board 39 for controlling voltages input to the first driving electrode 22, the second driving electrode 23, the third driving electrode 28, and the monitor electrode 27, and for processing signals output from the first detecting electrode 24, the second detecting electrode 25, the third detecting electrode 29, and the fourth detecting electrode 30.

The electronic components 40 composes a circuit shown in FIG. 5. A monitor circuit 44 includes a current amplifier 45 for receiving a charge from the monitor electrode 27 of the tuning form 31a, a band pass filter (BPF) 46 for receiving a signal output from the current amplifier 45, a rectifier 47 for receiving a signal output from the BPF 46, and a smoothing circuit 48 for receiving a signal output from the rectifier 47. A signal output from the smoothing circuit 48 is input to an AGC circuit 49 for amplifying and attenuating the amplitude at the BPF 46. A signal output from the AGC circuit 49 is sent to a drive controller 50 which then feeds the first driving electrode 22, the second driving electrode 23, and the fourth driving electrode 30 of the tuning fork 31a with driving signals. A first current amplifier 51 converts charges produced by Coriolis forces on the second detecting electrode 25 of the first oscillator 21 and the fourth detecting electrode 30 of the second oscillator 26 into voltages. Similarly, a second current amplifier 52 converts charges produced by Coriolis forces on the first detecting electrode 24 of the first oscillator 21 and the third detecting electrode 29 of the second oscillator 26 into voltages. A signal output from the first current amplifier 51 is added by a differential amplifier 53 with an inverse of the signal output from the second current amplifier 52. A signal output of the differential amplifier 53 is sent to another BPF 54 for allowing a signal only in a desired frequency band to pass. A phase shifter 55 delays a signal output from the BPF 54 by substantially 90 degrees in phase. A signal output from the phase shifter 55 is sent to a synchronous detector 56 where a negative voltage component substantially equal in phase to that of the signal output from the BPF 46 of the monitor circuit 44 is inverted to positive. A signal output from the synchronous detector 56 is then smoothed by a smoothing circuit 56a. A direct-current amplifier 56b amplifies a signal output from the smoothing circuit 56a. The support 36 is held from both sides by a rubber 57 having a substantially squared-C shape, and has a portion 59 having a decreased cross section. The portion 59 relieves a compressing force of the rubber 57. The first base 32, the cover 35, the support 36, the circuit board 39, and the rubber member 57 are accommodated in a bottomed metal case 60, hence allowing the rubber 57 to be placed under pressure between the inner side of the metal case 60 and the side surfaces of the support 36. The metal case 60 is shut up at its opening with a second base 61 having six through holes 62 provided therein. Source terminals 63, GND terminals 64, and output terminals 65 are inserted into the through holes 62 and electrically connected with a flexible wiring sheet 39a to the circuit board 39.

A procedure of assembling the angular velocity sensor of the embodiment will be described.

A tuning fork 31a including the first oscillator 21, the second oscillator 26, and the joint 31 is assembled by bonding sheets of mono-crystalline quartz having different crystalline axes.

Then, gold is vapor-deposited to make the first driving electrode 22, the second driving electrode 23, the first detecting electrode 24, and the second detecting electrode 25 on the front, back, outer side, and inner side surfaces of the first oscillator 21, respectively, and to make the monitor electrode 27, the third driving electrode 28, the third detecting electrode 29, and the fourth detecting electrode 30 on the front, back, outer side, and inner side surfaces of the second oscillator 26, respectively.

Then, the six terminals 34 are inserted into the corresponding terminal insertion holes 33 in the first base 32. As the holes 33 are filled with glass based insulating material (not shown), the six terminals 34 are mounted to the first base 32.

Then, the joint 31 is mounted to the first base 32, and the six terminals 34 are then electrically connected by wire bonding of gold leads (not shown) to the first driving electrode 22, the second driving electrode 23, the first detecting electrode 24, the second detecting electrode 25, the monitor electrode 27, the third driving electrode 28, the third detecting electrode 29, and the fourth detecting electrode 30.

The first base 32 is covered with the cover 35 under a vacuum condition so as to make the space surrounded by them in vacuum.

The support 36 is then joined to the first base 32 by swage locking of the support 37.

When the electronic components 40 are mounted on the circuit board 39, the support 36 is joined to the circuit board 39 by soldering the support projections 38.

The terminals 34 of the first base 32 are electrically connected by soldering to their corresponding electrodes (not shown) on the circuit board 39.

Then, the circuit board 39 and the support 36 are held together as sandwiched between the two portions of the substantially squared-C shaped rubber 57 having the cross-section-reduced portion 59.

Upon accepting the second fork base 61 accept the source terminal 63, the GND terminal 64, and the output terminals 65, the through holes 62 are filled with glass based insulating material (not shown) to fix the source terminal 63, the GND terminal 64, and the output terminals 65 to the second base 61.

Then, the circuit board 39 is electrically connected with a flexible wiring sheet 39a to the source terminal 63, the GND terminal 64, and the output terminals 65.

The cross-section-reduced portion 59 of the squared-C-shaped rubber 57 is picked up and compressed by a bar tool (not shown) and is installed together with the circuit board 39 and the support 36 in the case 60.

Finally, the opening of the case 60 is shut up with the second base 61.

An operation of the angular velocity sensor of this embodiment assembled in the foregoing procedure will be explained.

Figure 6:
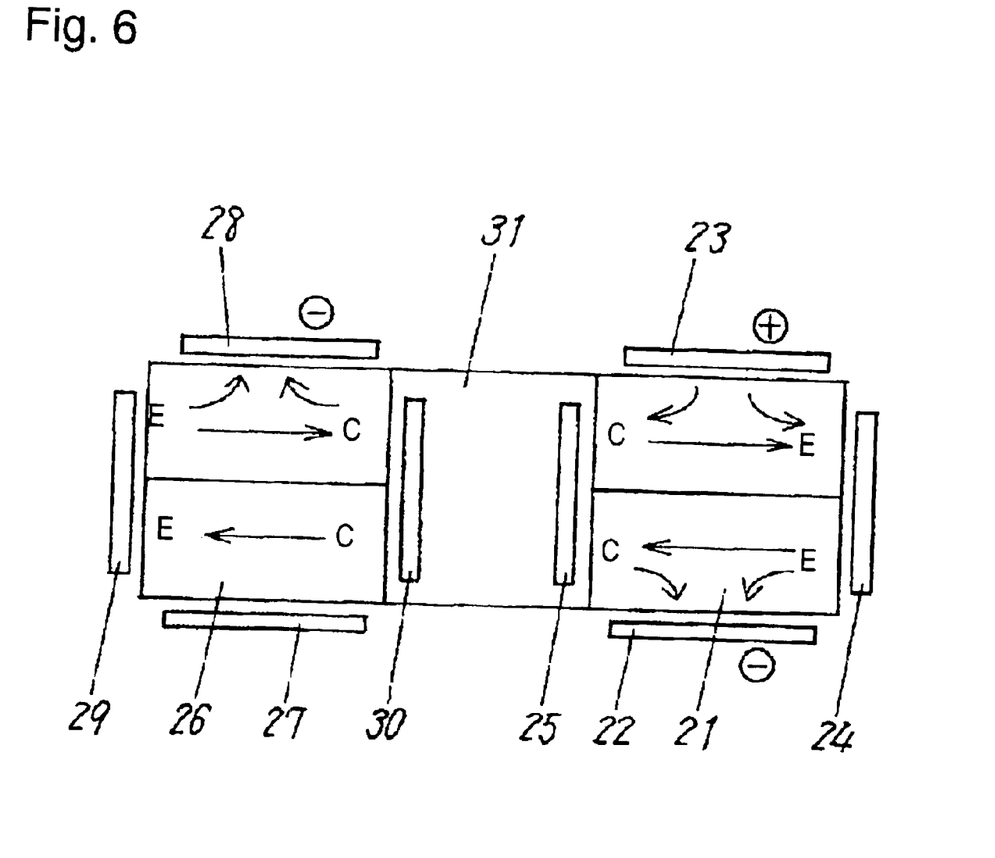
FIG. 6 is a schematic diagram showing an operation of the angular velocity sensor according to the embodiment.
Figure 7:
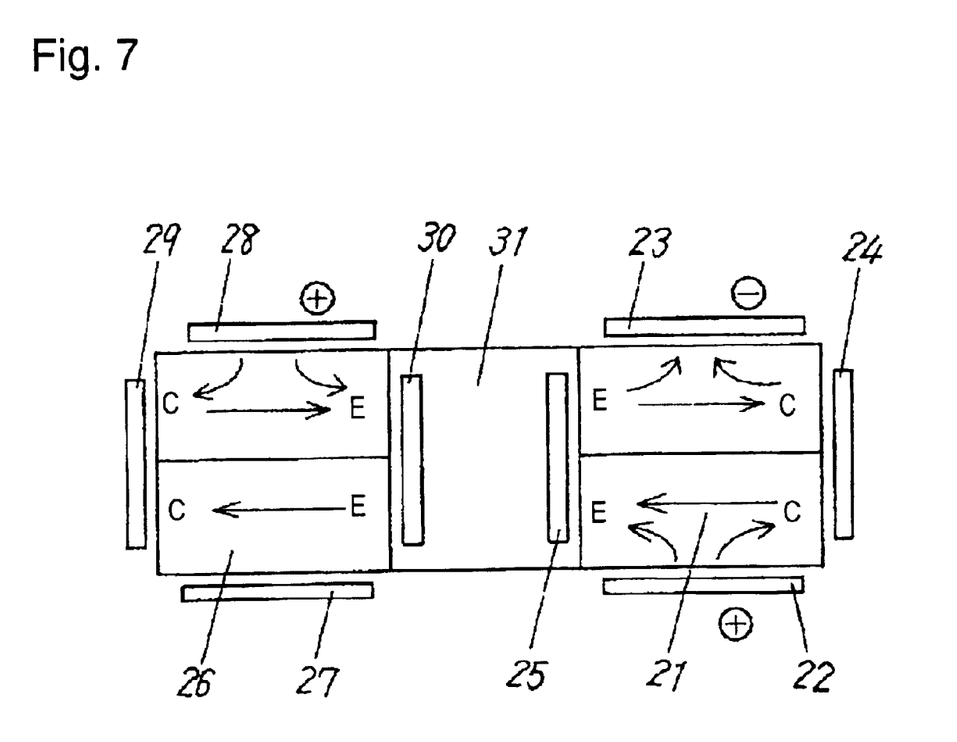
FIG. 7 is a schematic diagram showing an operation of the angular velocity sensor according to the embodiment.

The first driving electrode 22, the second driving electrode 23, and the third driving electrode 28 of the tuning fork 31a are fed with alternating-current voltages. More particularly, as shown in FIG. 6, a positive voltage is applied to the second driving electrode 23 of the first oscillator 21, while a negative voltage is applied to the first driving electrode 22. This causes the first detecting electrode 24 to expand since the crystalline axis of the quartz sheets extends along a direction of charge. Meanwhile, the second detecting electrode 25 contracts since its crystalline axis extends in a direction reverse against the charge. The first oscillator 21 is accordingly tilted towards the second oscillator 26. Then, as shown in FIG. 7, a negative voltage is applied to the second driving electrode of the first oscillator 21, while a positive voltage is applied to the first driving electrode 22. This causes the first detecting electrode 24 to contract since the crystalline axis of the quartz sheets extends in a direction reverse against the charge. Meanwhile, the second detecting electrode 25 is expanded because the crystalline axis extends in a direction of the charge. The first oscillator 21 is accordingly tilted towards the outside.

The third driving electrode 28 of the second oscillator 26 is also fed with an alternating-current voltage. Since being mechanically joined to each other by the joint 31, the first oscillator 21 and the second oscillator 26 oscillate at a velocity V equal to an eigen frequency of the driving direction along the lengthwise direction of the joint 31. For keeping the oscillation in the driving direction of the tuning fork 31a constant, a charge induced on the monitor electrode 27 is fed to the current amplifier 45 converting the charge into a voltage in a sine-wave form. The voltage output from the monitor electrode 27 is sent to the BPF 46 of the monitor circuit 44 for filtering the voltage to extract a resonant frequency component of the tuning fork 31a for removing noises and for a sine-wave (a) shown in FIG. 8. The output of the BPF 46 is then fed to the rectifier 47 for converting its negative component into a positive voltage component, and is fed to the smoothing circuit 48 for converting into a direct-current voltage. When the direct current voltage output from the smoothing circuit 48 is too large, the AGC circuit 49 attenuates the output of the BPF 46. When it is too small, the AGC circuit 49 supplies to the driving control circuit 50, an amplified output of the BPF 46. These operations maintains the oscillation of the tuning fork 31a constant. While the first oscillator 21 and the second oscillator 26 perform a flex oscillation at the velocity V along the driving direction, the tuning fork 31a rotates at an angular velocity of ω about the lengthwise extending center axis, and the rotation generates a Coriolis force of $F=2\,mV\omega$ on the first oscillator 21 and the second oscillator 26.

Controlling the size of the notch 31b having a surface roughness of not higher than 2 μm on the edge of the first oscillator 21, the first oscillator 21 and the second oscillator 26 are balanced in weight as listed in Table 2.

TABLE 2

| | Surface Roughness Rmax (μm) | Output Voltage with No Angular Velocity (mV) |
|---|---|---|
| Sample 1 | 1.8 | +0.3 |
| Sample 2 | 1.7 | +1.6 |
| Sample 3 | 1.9 | +2.4 |
| Sample 4 | 1.8 | −0.9 |
| Sample 5 | 1.9 | −0.7 |

When no angular velocity is applied to the angular velocity sensor, both the first oscillator 21 and the second oscillator 26 receive no external forces except along the direction of oscillation. Accordingly, the output voltage can be measured of ±3 mV, thus ensuring the accuracy of the angular velocity.

Figure 8:
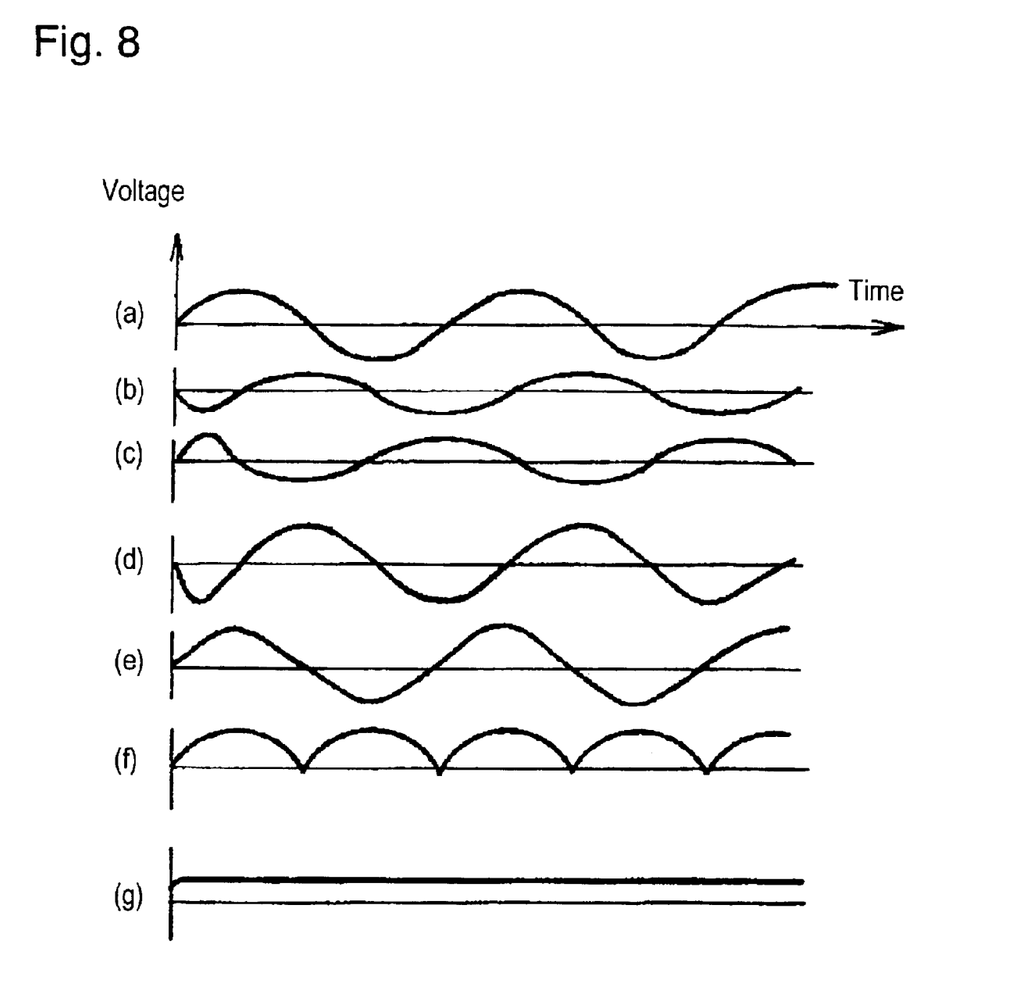
FIG. 8 is a waveform diagram showing an operation of the angular velocity sensor according to the embodiment.

The Coriolis force induces a voltage (b) in FIG. 8 on both the first detecting electrode 24 and the third detecting electrode 29, and induces a voltage (c) on both the second detecting electrode 25 and the fourth detecting electrode 30 which is 180 degrees out of phase with the voltage (b). The voltage (b) is then amplified by the current amplifier 51, while the voltage (c) is amplified by the current amplifier 52. The signal output from the current amplifier 51 is sent to the differential amplifier 53 where the signal is summed with an inverse of the signal output from the current amplifier 52 to develop a voltage (d). The BPF 54 extracts a resonant frequency component of the tuning fork 31a from the voltage (d) for removing noises. The phase shifter shifts the output of the BPF 54 by substantially 90 degrees to output a voltage (e). Based on the frequency of the output of the BPF 46, the voltage (e) output from the phase shifter 55 is phase-detected by the synchronous detector 56, and then, the voltage has its negative component converted into positive to develop a voltage (f). The positive voltage output from the synchronous detector 56 is smoothed by the smoothing circuit 56a and amplified by the direct-current amplifier 56b to output a voltage (g). The output of the direct-current amplifier 56b is then sent as an angular velocity signal to a computer (not shown) for calculating an angular velocity.

Figure 9:
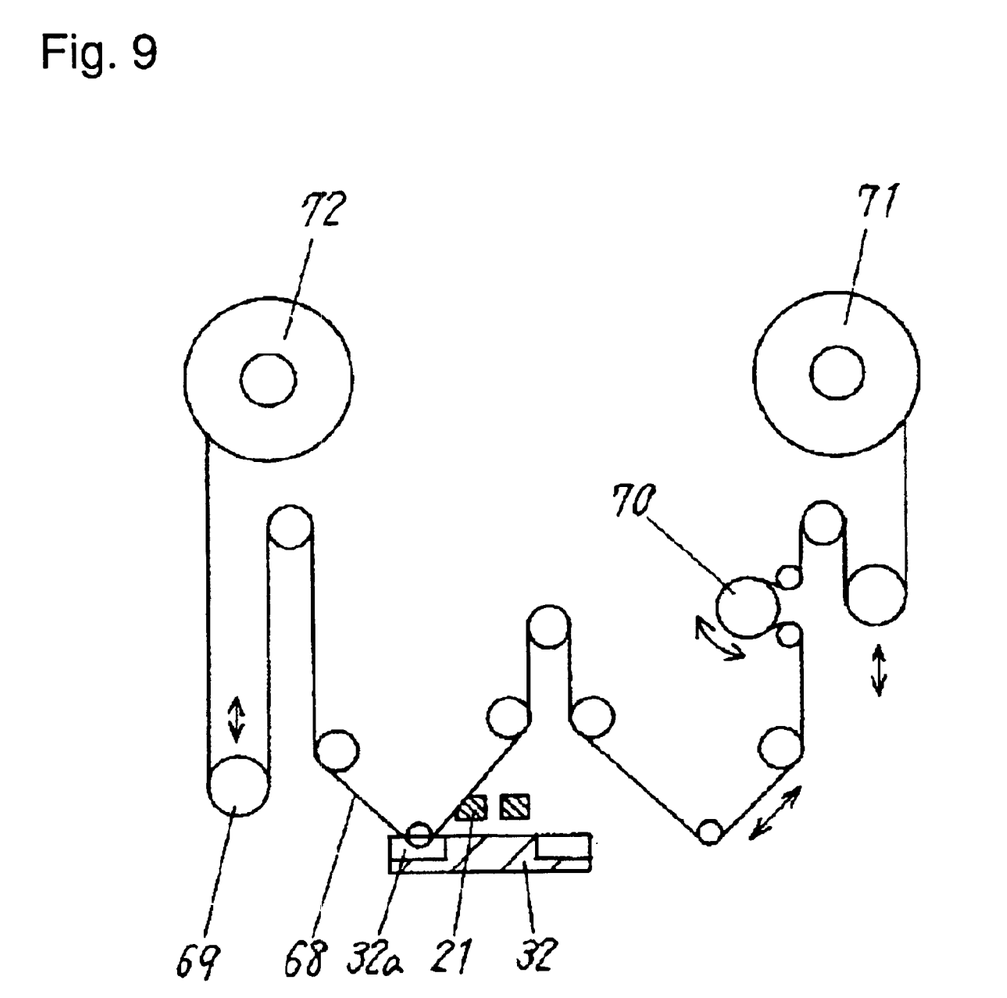
FIG. 9 is a side view showing a method of adjusting a characteristic of the angular velocity sensor according to the embodiment.
Figure 11:
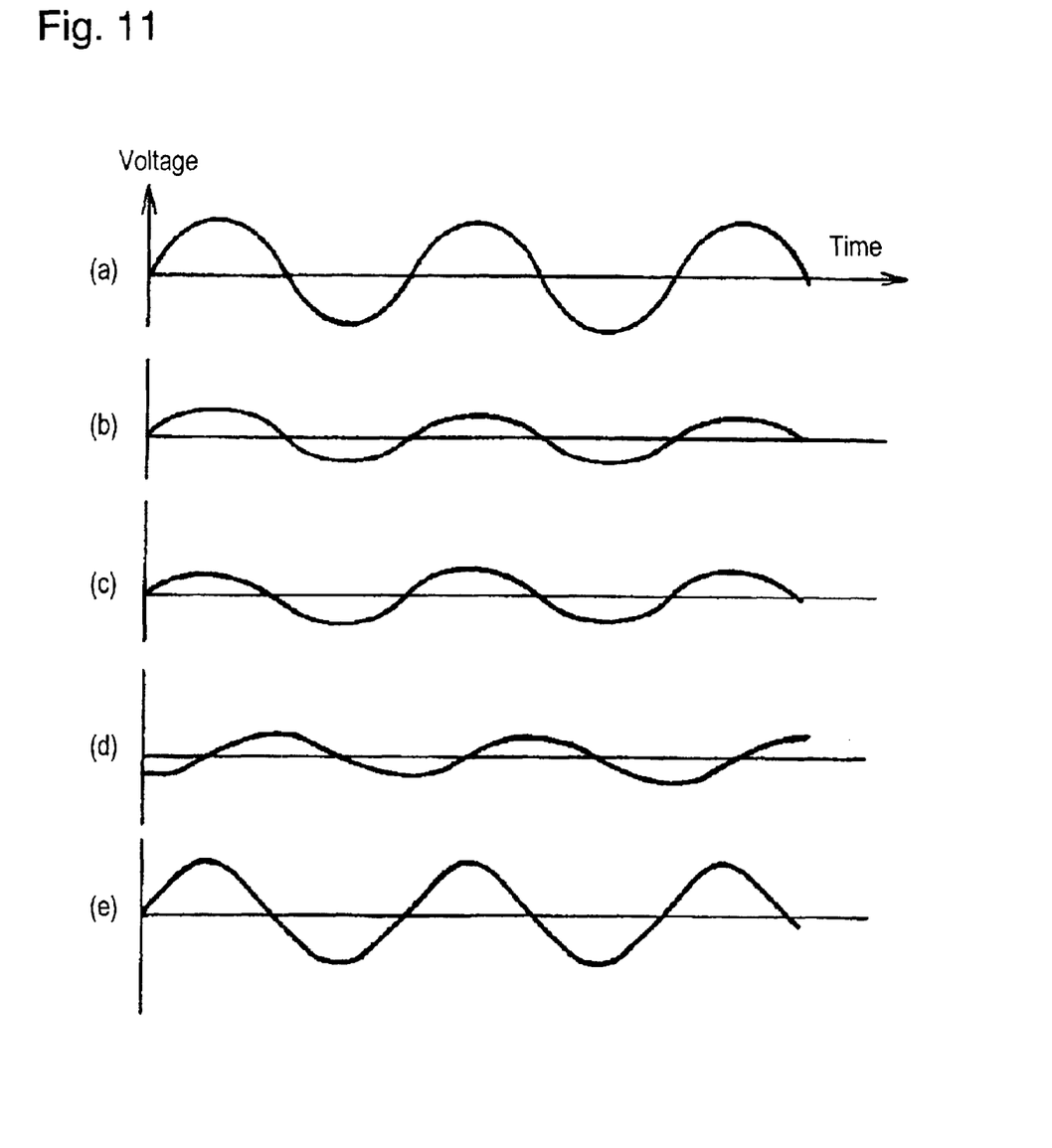
FIG. 11 a waveform diagram showing the step of adjusting the characteristic of the angular velocity sensor according to the embodiment.
Figure 12:
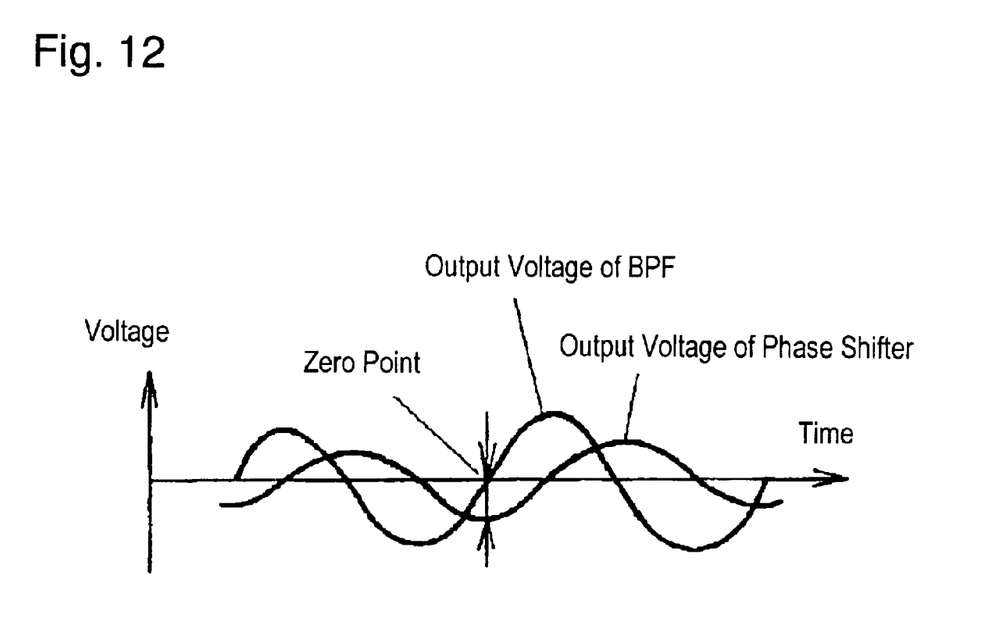
FIG. 12 illustrates output voltages of a band pass filter in a monitor circuit and of a phase shifter in a detector of the angular velocity sensor according to the embodiment.

FIG. 9 is a side view showing a method of adjusting characteristics of the angular velocity sensor. FIG. 10 is a perspective view of the tuning fork of the angular velocity sensor being ground with a tape. FIG. 11 is a waveform diagram for adjusting the characteristics of the angular velocity sensor. FIG. 12 illustrates signals output from the phase shifters in the detector and the BPF of the monitor circuit in the angular velocity sensor.

Under the condition that no angular velocity is applied to the angular velocity sensor, if not being balanced in weight, the first oscillator 21 and the second oscillator 26 are displaced perpendicularly to a driving direction even with no signal output from the monitor electrode 27. Accordingly, as if a Coriolis force is generated by an angular velocity, the second detecting electrode 25 and the fourth detecting electrode 30 output the signal (a) shown in FIG. 11, and the first detecting electrode 24 and the third detecting electrode 29 output the signal (b).

In the angular velocity sensor of the embodiment, the signal output from the phase shifter 55 in the monitor circuit 44 is first compared in a comparator (not shown) provided in a trimming apparatus.

Then, a tape 68 with an abrasive 67 of diamond is disposed in the setback 32a of the base 32 until the tape contacts with the edge of the first oscillator 21 of the tuning fork 31a, as shown in FIG. 10 if the signal from the phase shifter 55 is negative at a zero point where the output of the BPF 46 shifts from negative to positive, as shown in FIG. 12.

At the moment, since the tape 68 is disposed in the setback 32a, the grinding by the tape is hardly interrupted by the base 32, and the tape contacts with the edge of the first oscillator 21. This arrangement allows the tape 68 to be directly engaged with the edge of the first oscillator 21 at a desired angle.

Then, as shown in FIG. 9, the tape 68 is loaded with a tension roller 69. Accordingly, the tape 68 remains urged by a constant force derived from the weight of the tension roller 69, thus contacting with the first oscillator 21. As shown in FIG. 10, the tape 68 contacts particularly at an angle of about 7 degrees to the lengthwise direction of the first oscillator 21 which is hence urged towards the joint 31 by a greater force. This arrangement prevents the first oscillator 21 from being deflected at a side towards the joint 31 and from dodging from any external stress. This allows the first oscillator 21 to be precisely cut along the edge to shape the notch portion 12.

Even when being stressed by a greater level of the external force, the tape 68 has flexibility which absorbs the force exerted on the first oscillator 21 or the second oscillator 26. This allows both the first oscillator 21 and the second oscillator 26 to be loaded steadily and uniformly. This prevents the first oscillator 21 from being fractured when being loaded.

As being urged by the tension roller 69, the tape 68 can uniformly press against the edge of the first oscillator 21 which is thus free from an excessive stress in a moment. This prevents the first oscillator 21 from being fractured during the adjustment of the characteristics.

A driving roller 70 rotating forward and backward forms the notch 31b on the tuning fork 31a. This has the first oscillator 21 and the second oscillator 26 of the tuning fork 31a balanced in weight.

Driving voltages through the first driving electrode 22, the second driving electrode 23, and the third driving electrode 28 displace the first oscillator 21 and the second oscillator 26 perpendicularly to the driving direction even if no signal is output from the monitor electrode 27. As a result, the signal outputs from the first detecting electrode 24, the second detecting electrode 25, the third detecting electrode 29, and the fourth detecting electrode 30 can be measured as small as ±3 mV, i.e., almost zero.

Finally, the tape 68 is wound up by rotating a tape-winding reel 71 by a predetermined amount, and then, is released from a tape-feeding reel 72 by a predetermined amount. This allows an unused portion of the tape 68 to contact with the first oscillator 21 and the second oscillator 26.

In the description of the method of adjusting the characteristics of the angular velocity sensor of the embodiment, the output of the phase shifter 55 is negative at the zero point where the output of the BPF 46 shifts from negative to positive. In case that the signal output from the phase shifter 55 is positive, the second oscillator 26 is ground at its edge for allowing the first oscillator 21 and the second oscillator 26 to be balanced in weight.

INDUSTRIAL APPLICABILITY

The angular velocity sensor of the present invention includes two oscillators precisely balanced in weight, and thus, the oscillators do not receive an external force except along a driving direction while an angular velocity is not applied. This allows the angular velocity sensor to measure an angular velocity accurately.

What is claimed is:

1. An angular velocity sensor comprising:
   a first oscillator;
   a second oscillator; and
   a joint coupling said first and second oscillators,
   wherein at least one of said first and second oscillators has a notch having a surface roughness of not higher than 2 $\mu$m in an edge thereof.

2. A method of adjusting a characteristic of an angular velocity sensor, comprising the steps of:
   providing an angular velocity sensor which includes a first oscillator, a second oscillator, a joint coupling the first and second oscillators, a driving electrode provided on at least one of the first and second oscillators, and a detecting electrode provided on at least one of the first and second oscillators; and
   forming a notch in an edge of at least one of the first and second oscillators by grinding the edge with an abrasive implanted tape running thereon, so that the signal output from the detecting electrode is substantially zero when an alternating-current voltage is applied to the driving electrode while no angular velocity is applied to the angular velocity sensor.

3. The method according to claim 2, wherein the tape is loaded by a tension roller.

4. The method according to claim 2, wherein said step of forming the notch comprises the sub-step of running the tape on the edge of the first oscillator askew about a lengthwise direction of the first oscillator to apply an external force to the first oscillator at a side towards the joint.

5. The method according to claim 2, wherein said step of forming the notch comprises the sub-step of running the tape on the edge of the second oscillator askew about a lengthwise direction of the second oscillator to apply an external force to the first oscillator at a side towards the joint.

6. The method according to claim 2, wherein said step of forming the notch comprises the sub-steps of running the tape on the first and second oscillators askew about respective lengthwise directions of the first and second oscillators to apply an external force on the first and second oscillators at respective sides towards the joint.

7. An angular velocity sensor comprising:
   a first oscillator having a notch formed in an edge thereof;
   a second oscillator;
   a joint coupling one end of said first oscillator and one end of said second oscillator;
   a driving electrode provided on one of the first and second oscillators;
   a detecting electrode provided on one of said first and second oscillators;

a base having said joint mounted thereto, said base having a terminal electrically connected to said driving electrode and said detecting electrode, said base having a setback, which is a recess, formed in a portion facing said first oscillator and corresponding to said notch for allowing a tape to pass during shaping said notch; and a cover for covering said base and for accommodating said first and second oscillators and said joint.

8. An angular velocity sensor comprising:

a first oscillator having a first notch formed in an edge thereof;

a second oscillator having a second notch formed in an edge thereof;

a joint coupling one end of said first oscillator and one end of said second oscillator;

a driving electrode provided on one of said first and second electrodes;

a detecting electrode provided on one of said first and second electrodes;

a base having said joint mounted thereto, said base having a terminal electrically connected to said driving electrode and said detecting electrode, said base having first and second setbacks, which are recesses, formed in respective portions facing said first and second oscillators and corresponding to said first and second notches each for allowing a tape to pass during shaping said first and second notches; and a cover for covering said base and for accommodating said first and second oscillators and said joint.

* * * * *